(12) United States Patent
Widmark

(10) Patent No.: US 12,481,281 B2
(45) Date of Patent: Nov. 25, 2025

(54) SYSTEM FOR CONTROLLING MOVEMENTS OF A MARINE SURFACE VESSEL

(71) Applicant: Humphree AB, Gothenburg (SE)

(72) Inventor: Christer Widmark, Partille (SE)

(73) Assignee: Humphree AB, Gothenburg (SE)

( * ) Notice: Subject to any disclaimer, the term of this patent is extended or adjusted under 35 U.S.C. 154(b) by 182 days.

(21) Appl. No.: 18/455,040

(22) Filed: Aug. 24, 2023

(65) Prior Publication Data
US 2024/0069548 A1   Feb. 29, 2024

(30) Foreign Application Priority Data

Aug. 27, 2022  (SE) .................................... 2251001-0

(51) Int. Cl.
*B63H 25/02* (2006.01)
*B63H 1/32* (2006.01)
*G05D 1/00* (2006.01)

(52) U.S. Cl.
CPC ............. *G05D 1/0206* (2013.01); *B63H 1/32* (2013.01)

(58) Field of Classification Search
CPC .......... G05D 1/0206; G05D 1/43; G05D 1/49; G05D 1/611; G05D 2109/30; B63H 1/32; B63H 2025/425; B63H 1/04; B63H 25/42; B63B 39/06
See application file for complete search history.

(56) References Cited

U.S. PATENT DOCUMENTS

| 5,118,315 A * | 6/1992 | Funami ................. B63H 20/08 440/1 |
| 7,305,928 B2 * | 12/2007 | Bradley ................ B63H 25/42 114/144 R |
| 9,694,892 B1 * | 7/2017 | Anschuetz ............ B63H 20/10 |
| 10,671,073 B2 * | 6/2020 | Arbuckle ............... B63H 25/42 |

(Continued)

FOREIGN PATENT DOCUMENTS

| AU | 2015339164 A1 | 5/2017 |
| EP | 2944556 A1 | 11/2015 |

(Continued)

OTHER PUBLICATIONS

Notice Regarding Swedish Search Report for Patent Application No. 2251001-0 mailed Apr. 12, 2023 (7 pages).

(Continued)

*Primary Examiner* — Masud Ahmed
(74) *Attorney, Agent, or Firm* — Sage Patent Group

(57) ABSTRACT

A system for controlling movements of a marine surface vessel includes a hull, a bow and a stern. A control unit being controls movements of one or more fins, which control movements of the vessel, in dependence on signals from a position input device, and on signals from a position detecting device. The fin(s) is connected to a respective actuator via a rotation shaft adapted to protrude from the vessel hull, wherein the rotation shaft defines a rotational axis of the fin. Each fin comprises a fin base adapted to be at a first distance from the hull, and a fin tip adapted to be at a second distance from the hull, which second distance is larger than the first distance, wherein a leading edge of the fin, and a trailing edge of the fin extend on opposite sides of the fin, from the fin base to the fin tip.

16 Claims, 4 Drawing Sheets

(56) References Cited

U.S. PATENT DOCUMENTS

| | | | | |
|---|---|---|---|---|
| 2007/0089660 | A1* | 4/2007 | Bradley | B63H 21/22 |
| | | | | 114/144 A |
| 2014/0114509 | A1* | 4/2014 | Venables | B63B 39/06 |
| | | | | 701/21 |
| 2020/0140044 | A1* | 5/2020 | Seville | G01S 13/874 |
| 2021/0124374 | A1* | 4/2021 | Bartlett | G05D 1/0875 |
| 2021/0129949 | A1* | 5/2021 | Inoue | B63B 43/00 |

FOREIGN PATENT DOCUMENTS

| | | |
|---|---|---|
| EP | 3363729 A1 | 8/2018 |
| GB | 2030726 A | 4/1980 |
| JP | S5932591 A1 | 2/1984 |
| WO | 2021140409 A1 | 7/2021 |
| WO | 2022013014 A1 | 1/2022 |

OTHER PUBLICATIONS

Communication pursuant to Article 94(3), EP Patent Application No. 23193034.8, mailed Jul. 10, 2025, 5 pages.
Extended European Search Report, EP Patent Application No. 23193034.8, mailed Feb. 28, 2024, 9 pages.

* cited by examiner

SYSTEM FOR CONTROLLING MOVEMENTS OF A MARINE SURFACE VESSEL

CROSS REFERENCE TO RELATED APPLICATION

This application claims the priority of Swedish Patent Application No. 2251001-0 filed with the Swedish Patent Office on Aug. 27, 2022, which is incorporated herein by reference in its entirety.

TECHNICAL FIELD

The invention relates to a system for controlling movements of a marine surface vessel, a method for controlling a movements of a marine surface vessel, a computer program, a computer readable medium, a control unit, and a marine surface vessel.

BACKGROUND

A user of a marine surface vessel, e.g. a power boat, such as a pleasure boat, a yacht, or a passenger boat, may want to keep the vessel stationary at a selected position away from land, by anchoring. It may be desired to keep the vessel in the position for an extended period of time, such as one or more hours, days, or weeks.

However, in many areas, anchors may cause damage to the seabed, for example to rocks, corals, or plants thereof. In some areas, offshore anchoring is not allowed for this reason.

There is therefore a desire to find an alternative manner to keep a marine surface vessel at a selected position offshore.

GB2030726A discloses a control system for seagoing vessels, for actuation of "a single fin device, in plurality, operational at any depth of sea or ocean environment for vessel movement in any desired direction, or to maintain stationariness automatically, to the exclusion of the rudder, air and water screw propeller, air and water jet propulsion and associated control and installation thereof". The document discloses in FIG. 2 a vessel with laterally extending wings, each having a fin at an edge of the respective wing. However, the vessel in the document seems poorly adapted to keeping a surface vessel at a selected position for an extended period of time.

SUMMARY

An object of the invention is to provide an improved way of keeping a marine surface vessel at a selected position offshore, preferably for an extended period of time.

The object is reached with a system according to claim 1. Thus, the invention provides a system for controlling movements of a marine surface vessel comprising a hull, a bow and a stern, the system comprising
- a position input device arranged to specify, in dependence on a user input, a desired position of the vessel in a geographic coordinate system,
- a position detecting device arranged to detect an actual position of the vessel in the geographic coordinate system, and
- a control unit arranged to receive from the position input device signals representative of the desired position of the vessel, and to receive from the position detecting device signals representative of the actual position of the vessel, wherein the system comprises one or more fins for controlling movements of the vessel by interaction with water supporting the vessel,
the control unit being arranged to control movements of one or more of the one or more fins in dependence on the signals from the position input device, and on the signals from the position detecting device, to keep the vessel at the desired position,
wherein each of said fins is connected to a respective actuator via a rotation shaft adapted to protrude from the vessel hull, wherein the rotation shaft defines a rotational axis of the fin,
wherein each of said fins comprises a fin base adapted to be at a first distance from the hull, and a fin tip adapted to be at a second distance from the hull, which second distance is larger than the first distance, wherein a leading edge of the fin, and a trailing edge of the fin extend on opposite sides of the fin, from the fin base to the fin tip,
wherein each of said fins is arranged to be turned at least 360 degrees around the rotational axis.

The position input device may be adapted for use by a person, e.g. by means of a touch sensitive display. By such use, a desired position for the vessel may be selected. In some embodiments, position input device may be adapted for use by an automatic vessel controller. The vessel position detecting device may comprise a global positioning system (GPS) sensor. The control unit may be programmed for the control of the movements of the at least one of the one or more fins.

Embodiments of the invention provide for keeping the vessel at the desired position with one or more fins arranged to be turned at least 360 degrees around the rotational axis of the rotation shaft protruding from the hull. The one or more fins may be provided on a lower surface of the hull, whereby the rotational axis extends at least partly downwards. Each of said one or more fins may be drivable by the respective actuator. Each actuator may comprise an electric motor. Each actuator may comprise a reduction gearing. The leading edge of the respective fin may be exposed to the surrounding water. The one or more fins may be arranged to paddle in the surrounding water. The one or more fins may provide one or more thrusts to keep the marine vessel stationary.

The fin type of embodiments of the invention makes the vessel well adapted to rope and chainless anchoring, also for extended periods of time. In particular, since the fin can be turned a full revolution or more, the fin can exert a hydrodynamic force in any direction in relation to the vessel. This will not be possible with a fin at an edge of a wing extending from the vessel hull. The use of a fin with limitless turnability allows for keeping the vessel in its position regardless of its direction. In addition, the position of the vessel can be retained with a single fin. This is possible in particular if the fin is provided at, or in the vicinity of, the center of gravity of the vessel.

In some embodiments, the system comprises two or more fins. Thereby, since the fins are 360 degree rotatable, the vessel position can be kept, while the vessel can be turned by means of the fins in any direction.

Preferably, the system comprises a roll detection arrangement, arranged to detect a roll angle and/or a roll rate of the vessel, wherein the control unit is arranged to receive from the roll detection arrangement signals representative of the roll angle and/or the roll rate, the control unit being arranged to control movements of at least one of the one or more fins in dependence on the signals from the roll detection arrangement so as to decrease the roll angle and/or the roll rate. Thereby, the one or more fins can be used for keeping the vessel in a selected position, and simultaneously to decrease roll movements of the vessel. Thereby, rolls movements may be decreased, even if the vessel, with a ropeless and chainless anchoring, is oriented so as to encounter waves from the side.

Preferably, the system comprises two or more fins, wherein the control unit is arranged to control movements of one or more, but less than all, of the fins in dependence on the signals from the position input device, and on the signals from the position detecting device, but not in dependence on the signals from the roll detection arrangement, the control unit further being arranged to control movements of one or more of the remaining one or more fins in dependence on the signals from the roll detection arrangement, but not in dependence on the signals from the position input device, and not in dependence on the signals from the position detecting device.

Thereby, the system may be arranged so as for one or more of the fins to be used for roll stabilization but not for keeping the vessel position, while one or more of the fins are used for keeping the vessel position but not for roll stabilization. Such a division of functions between the fins ensures an effective result from the actions of each fin.

Preferably, the system comprises two or more fins, wherein the control unit is arranged to establish whether a predetermined condition exists, wherein the control unit is arranged to control, when the existence of the predetermined condition is not established, movements of less than all fins to keep the vessel at the desired position, wherein the control unit is arranged to control, when the existence of the predetermined condition is established, movements of all fins to keep the vessel at the desired position. Preferably, the control unit is arranged to determine a distance of the actual position from the desired position, wherein the predetermined condition is that the distance of the actual position from the desired position is larger than a predetermined distance threshold value.

Thereby, in a situation where the functions of roll stabilization and vessel position keeping is distributed to different fins, and the vessel position cannot be kept, e.g. due to an increasing current, increasing wind, or increasing waves, all fins are used for the vessel position keeping.

Preferably, the control unit is arranged to store a value of a natural roll frequency of the vessel, and to control the movements of the one or more of the one or more fins, in dependence on the value of the natural roll frequency, so as to avoid, or reduce a tendency of, the fin movements exciting the roll angle and/or the roll rate of the vessel. Thus, the control unit may be arranged to control the movements of the one or more of the one or more fins, in dependence on the value of the natural roll frequency, on the signals from the position input device, and on the signals from the position detecting device. For example, the fins may paddle with a frequency which is at some distance from the natural roll frequency. Thereby, it may be effectively avoided that the fin movements for the vessel position keeping excites roll movements of the vessel.

Preferably, the control unit is arranged to determine in dependence on the signals from the position input device, and on the signals from the position detecting device, a direction of movement of the vessel in relation to the desired position, and to control the movements of one or more of the one or more fins in dependence on the determined direction of movement of the vessel, so as for the bow of the vessel to point in a direction which is opposite to the determined direction of movement. Thereby, the control unit may be arranged to control the movements of one or more of the one or more fins, so as to turn the vessel to point in the direction which is opposite to the determined direction of movement. Thereby, the vessel may be controlled so as to point in a direction against waves, the wind, and/or a current, so as to reduce the thrust needed from the fins to keep the vessel in the desired position.

Preferably, the control unit is arranged to perform said control so as for the bow of the vessel to point in the direction which is opposite to the determined direction of movement, if the actual position is at a distance from the desired position which is larger than a predetermined distance threshold value. Thereby, the system can be arranged to determine whether the actual position is at a distance from the desired position. The predetermined distance threshold value may form a circle with the desired position in the middle. When the actual position is outside the circle, it may be determined that the vessel is unable to keep the desired position. The reason may be that waves, wind, and/or a current increase. By turning the vessel's bow towards the waves, the wind, and/or the current, the resistance decreases. Thereby, the vessel actual position can be returned to within the circle. When within the circle, the thrusts that the fins need to generate to keep the vessel actual position within the circle will be relatively low. Thus, said control can be used to improve, or retain, the vessel position keeping capacity when the waves, the wind, and/or a current increase.

The object is also reached with a method for controlling a movements of a marine surface vessel comprising a hull, a bow, and a stern, the method comprising receiving signals representative of a desired position of the vessel in a geographic coordinate system, and receiving signals representative of an actual position of the vessel in the geographic coordinate system, wherein the method further comprises, where the vessel comprises one or more fins for controlling movements of the vessel by interaction with water supporting the vessel, controlling, in dependence on the signals representative of the desired position, and on the signals representative of the actual position, one or more of the one or more fins, to keep the vessel at the desired position, receiving signals representative of a roll angle and/or a roll rate of the vessel, and controlling movements of one or more of the one or more fins in dependence on the signals representative of the roll angle and/or the roll rate so as to decrease the roll angle and/or the roll rate.

Thereby, as also suggested above, the one or more fins can be used for keeping the vessel in a selected position, and simultaneously to decrease roll movements of the vessel. Thereby, an improved rope and chainless anchoring is provided.

Similarly to what has been suggested above, where the vessel comprises two or more fins, the method may comprise controlling movements of one or more but less than all of the fins in dependence on the signals representative of the desired position, and on the signals representative of the actual position, but not on the signals representative of the roll angle and/or the roll rate, and controlling movements of the remaining one or more fins in dependence on the signals representative of the roll angle and/or the roll rate, but not on the signals representative of the desired position, and on the signals representative of the actual position.

Similarly to what has been suggested above, the method may comprise storing a value of a natural roll frequency of the vessel, and controlling the movements of the at least one of the one or more fins, in dependence on the value of the natural roll frequency, on the signals representative of the desired position, and on the signals representative of the actual position, so as to avoid, or reduce a tendency of, the fin movements exciting the roll angle and/or the roll rate of the vessel.

The object is also reached with a method for controlling a movements of a marine surface vessel comprising a hull, a bow, and a stern, the method comprising receiving signals representative of a desired position of the vessel in a geographic coordinate system, and receiving signals representative of an actual position of the vessel in the geographic coordinate system, wherein the method further comprises, where the vessel comprises one or more fins for controlling movements of the vessel by interaction with water supporting the vessel, controlling in dependence on the signals representative of the desired position, and on the signals representative of the actual position, one or more of the one or more fins, to keep the vessel at the desired position, and determining in dependence on the signals representative of the desired position, and on the signals representative of the actual position, a direction of movement of the vessel in relation to the desired position, and controlling the movements of one or more of the one or more fins in dependence on the determined direction of movement of the vessel, so as for the bow of the vessel to point in a direction which is opposite to the determined direction of movement.

As suggested, thereby the vessel may be controlled so as to point in a direction against waves, the wind, and/or a current, so as to reduce the thrust needed from the fins to keep the vessel in the desired position. Thereby, an improved rope and chainless anchoring is provided.

Similarly to what has been suggested above, said control so as for the bow of the vessel to point in the direction which is opposite to the determined direction of movement, may be performed if the actual position is at a distance from the desired position which is larger than a predetermined distance threshold value.

The object is also reached with a computer program according to claim 11, a computer readable medium according to claim 12, a control unit according to claim 13, or a marine surface vessel according to claim 14.

Regarding the vessel, where the vessel comprises at least two fins arranged to be moved to keep the vessel at the desired position, the fins are preferably distributed around a center of gravity of the vessel. Thereby the thrusts from the fins may be effective for moving the actional position of the vessel, as well as for turning the vessel. It is understood that the distribution of the fins are preferably around the center of gravity as seen from above the vessel. In a vertical direction, the fins may all be offset, e.g. downwards, from the center of gravity.

In some embodiments, where the vessel comprises four fins, the fins are distributed in groups of two fins on opposite sides of a centerline of the vessel. Thereby, the rotational axes of the fins in each group are at a distance from each other, which distance is at least twice as large as a chord of the respective fin.

It should be noted that if the vessel is provided with a single fin for the position keeping, the fin is preferably located at the center of gravity, as seen from above the vessel.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
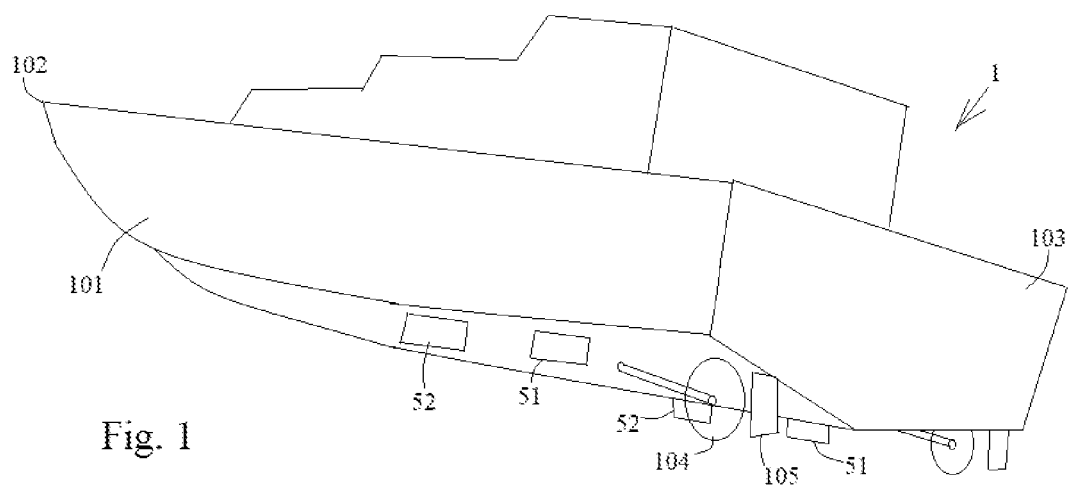
FIG. 1 is a perspective view of a marine vessel.

FIG. 1 shows schematically a marine vessel 1 in the form of a large power boat. It should be noted that the invention is equally applicable to other types of marine vessels, such as small power boats, power yachts, sailing yachts, and ships. The marine vessel 1 comprises a hull 101 having a bow 102 and a stern 103. The marine vessel 1 further comprises a propulsion system. A propulsion system of the vessel includes two propellers 104 and rudders 105.

The vessel comprises a system for controlling movements of the vessel 1. The system comprises four fins 51, 52 for controlling movements of the vessel by interaction with water supporting the vessel.

Figure 2:
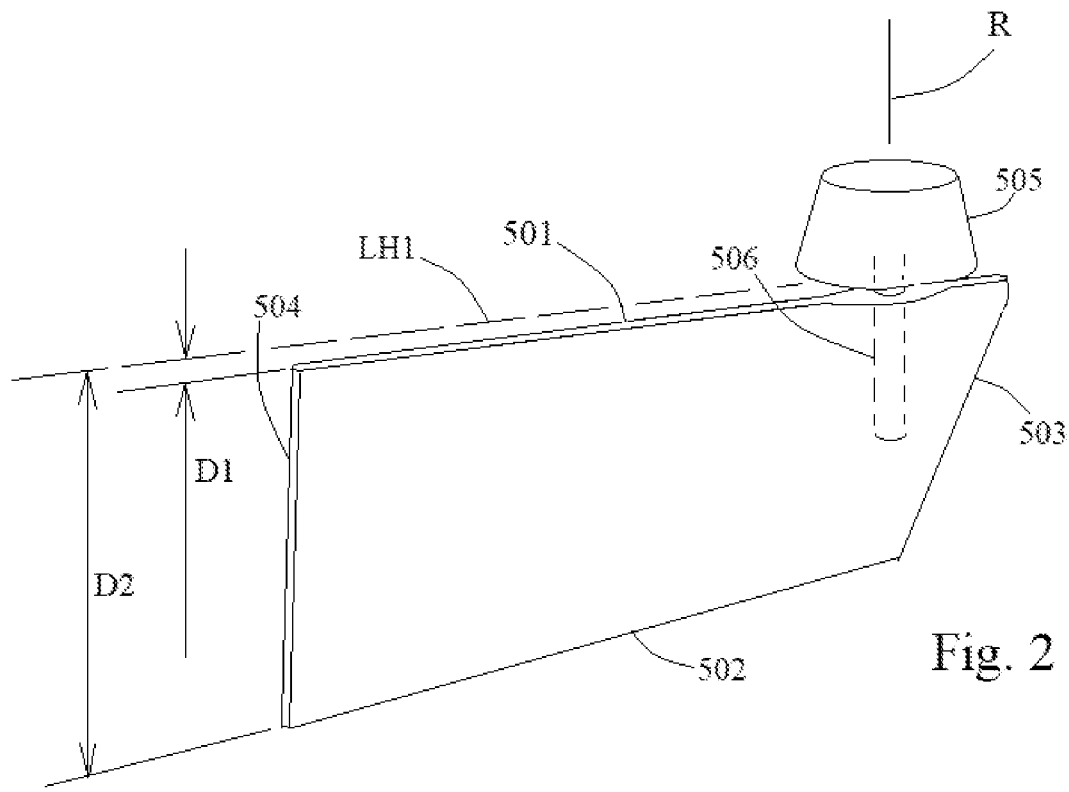
FIG. 2 is a perspective view of a fin of the vessel in FIG. 1, with a hidden part indicated with broken lines.

Reference is made also to FIG. 2. Each of said fins 51, 52 is connected to a respective actuator 505 via a rotation shaft 506 which protrudes from the vessel hull, wherein the rotation shaft defines a rotational axis R of the fin. Each actuator comprises an electric motor and a reduction gearing.

The fins are provided on a lower surface of the hull. FIG. 2 shows a broken line LH1 which coincides with the hull and extends along the fin. As detailed below, the fins are offset from a vessel centerline. The lower surface of the hull has a V-shaped cross-section. The rotation shaft 506 extends substantially perpendicularly from a local orientation of the hull surface. Therefore, the rotational axis R extends partly downwards and partly horizontally outwards in relation to the centerline of the vessel.

Each of said fins comprises a fin base 501 adapted to be at a first distance D1 from the hull. The first distance may be relatively short. The fin base may form an edge that extends along an orientation of the hull in a local region around the rotational axis R. The edge formed by the fin base may be relatively close to the hull.

Each of said fins further comprises a fin tip 502 adapted to be at a second distance D2 from the hull, which second distance is larger than the first distance. A leading edge 503 of the fin, and a trailing edge 504 of the fin extend on opposite sides of the fin, from the fin base 501 to the fin tip 502.

Each of said fins 51, 52 is arranged to be turned at least 360 degrees around the rotational axis.

Figure 3:
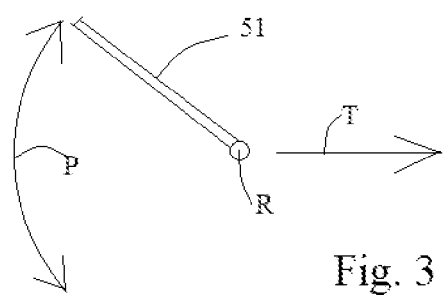
FIG. 3 a view of the fin in FIG. 2, as seen along a rotational axis of the fin.

Reference is made also to FIG. 3. The fins are arranged to paddle in the surrounding water. Thereby the fins provide thrusts. Since the fin can be turned a full revolution or more, the fin can exert a hydrodynamic force in any direction in relation to the vessel.

A paddling movement of a fin can be described as a reciprocating rotational movement around the rotational axis within a limited angular interval. The angular interval may be for example 45-135 degrees, for example 100 degrees. In FIG. 3, a paddling movement of one of the fins 51 is indicated with the double arrow P. The paddling movement results in a thrust T which has a direction which is opposite to a direction which is in the middle of the paddling angular interval P.

Figure 4:
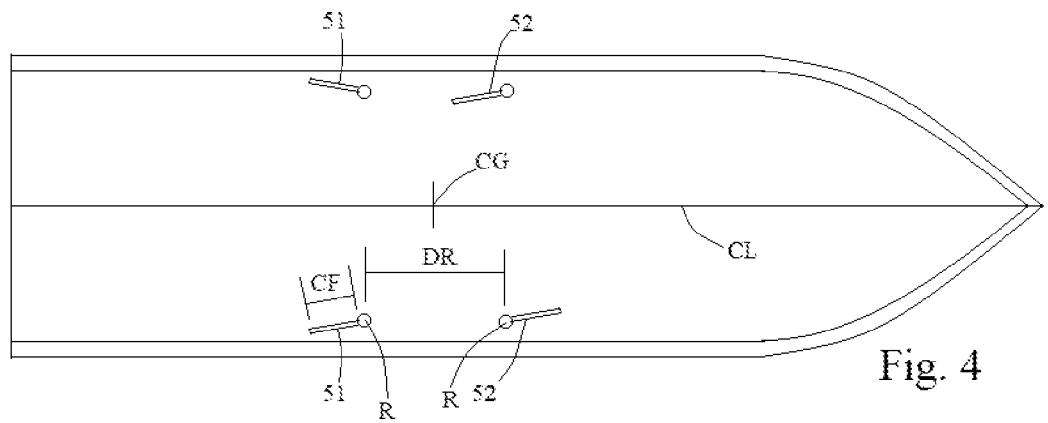
FIG. 4 is a view from underneath of the vessel in FIG. 1.

Reference is made also to FIG. 4. The fins 51, 52 are distributed around a center of gravity CG of the vessel. The fins are distributed in groups of two fins on opposite sides of the centerline CL of the vessel. Thereby, the rotational axes R of the fins in each group are at a distance DR from each other, which distance is at least twice as large as a chord CF of the respective fin.

Figure 5:
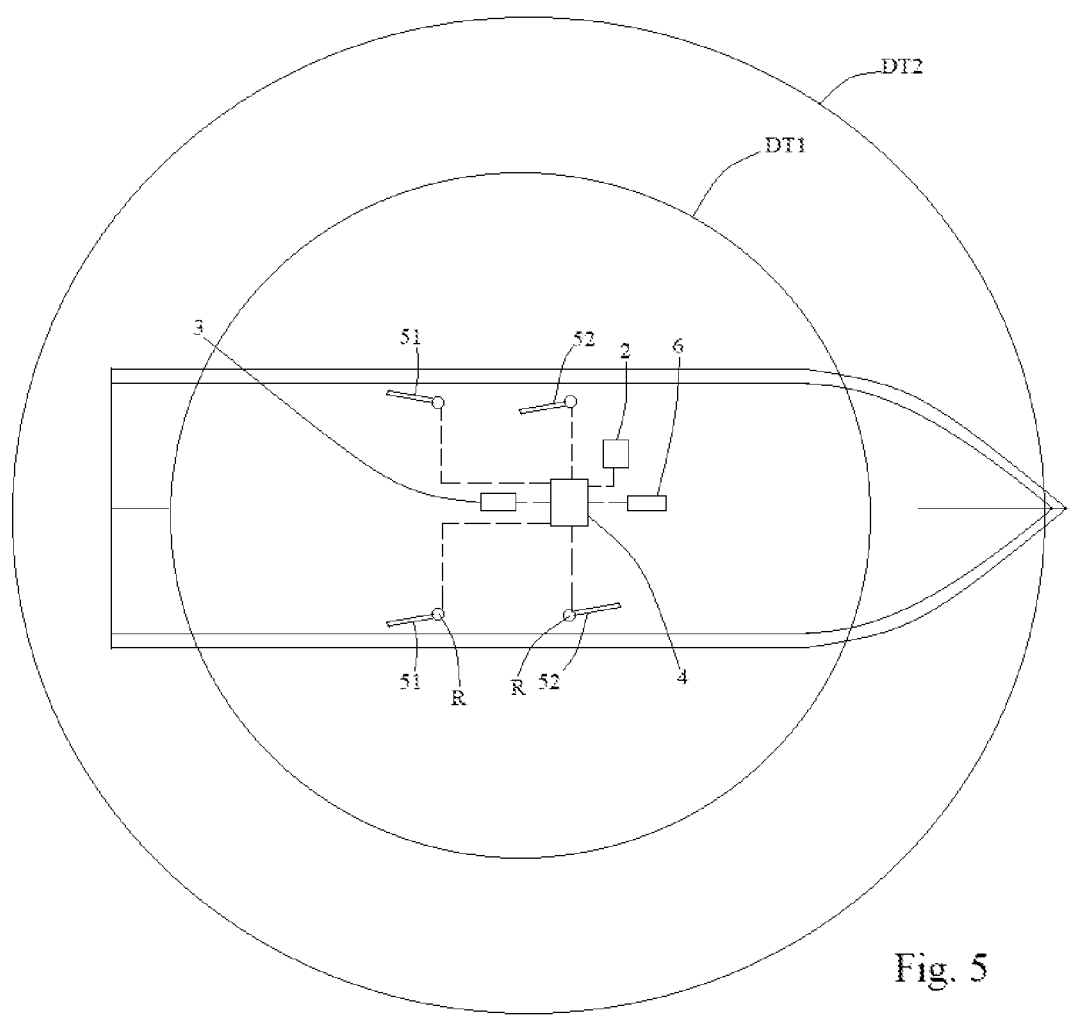
FIG. 5 is a view from underneath of the vessel in FIG. 1, in which some internal parts of the vessel are indicated.

Reference is made also to FIG. 5. The system for controlling movements of the vessel comprises a position input device 2 arranged to specify, in dependence on a user input, a desired position of the vessel in a geographic coordinate system. The position input device is adapted for use by a person, e.g. by means of a touch sensitive display.

The system further comprises a position detecting device 3 arranged to detect an actual position of the vessel in the geographic coordinate system. The vessel position detecting device comprises a global positioning system GPS sensor.

The system further comprises a control unit 4 programmed for the control of the movements of the fins. The control unit can be provided as a single physical device, or as a plurality of devices arranged to communicate with each other.

The control unit is arranged to receive from the position input device 2 signals representative of the desired position of the vessel, and to receive from the position detecting device 3 signals representative of the actual position of the vessel.

The control unit 4 is arranged to control movements of two of the fins 51 in dependence on the signals from the position input device 2, and on the signals from the position detecting device 3, to keep the vessel at the desired position, as exemplified below. The fins used for keeping the position are herein referred to as position keeping fins 51. In this example, the position keeping fins are the two fins located closest to the stern of the vessel.

The system further comprises a roll detection arrangement 6, arranged to detect a roll angle and/or a roll rate of the vessel. The roll detection arrangement 6 may comprise a gyro sensor. The control unit 4 is arranged to receive from the roll detection arrangement signals representative of the roll angle and/or the roll rate.

The control unit 4 is arranged to control movements of the two remaining fins 52 in dependence on the signals from the roll detection arrangement so as to decrease the roll angle and/or the roll rate, i.e. roll movements of the vessel. The fins used for decreasing the roll movements are herein referred to as roll decreasing fins 52. In this example, the roll decreasing fins 52 are the two fins located closest to the bow of the vessel.

Thereby, the system is arranged so as for two of the fins 52 to be used for roll stabilization but not for keeping the vessel position, while two of the fins 51 are used for keeping the vessel position but not for roll stabilization.

The control unit 4 is arranged to store a value of a natural roll frequency of the vessel. The natural roll frequency may be received from an external source. For example, it may be entered by a user of the system. In some embodiments, the control unit is adapted to determine the natural roll frequency of the vessel by a machine learning algorithm. The machine learning algorithm may use signals from the roll detection arrangement 6.

The control unit is arranged to control the movements of the position keeping fins 51 in dependence on the value of the natural roll frequency, so as to avoid, or reduce a tendency of, the fin movements exciting the roll movements of the vessel. More specifically, for keeping the vessel position, the fins 51 paddle with a frequency which is at some distance from the natural roll frequency.

Figure 6:
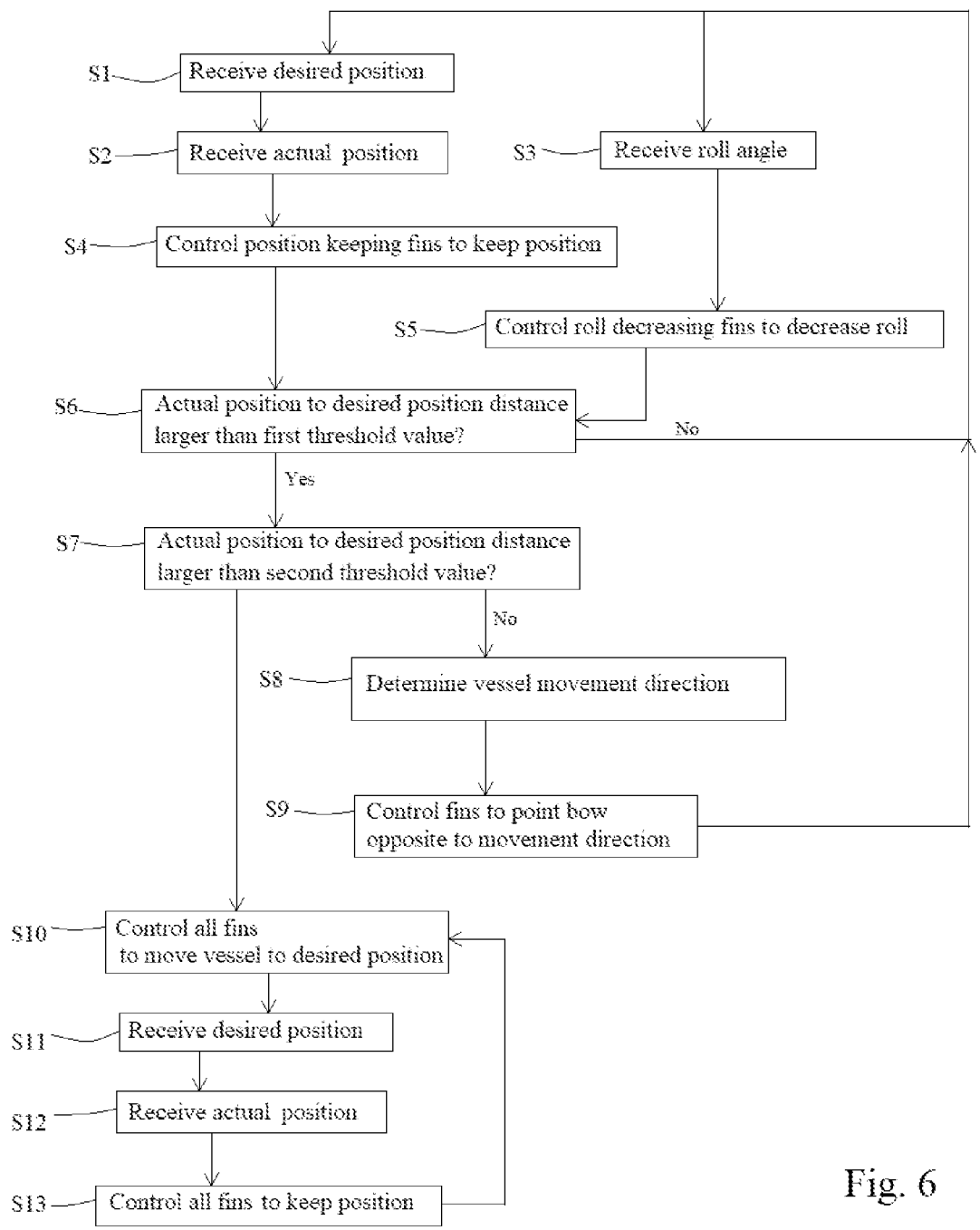
FIG. 6 depicts steps in an embodiment of a method for controlling movements of the vessel in FIG. 1.

Reference is made also to FIG. 6 depicting steps in an embodiment of a method for controlling movements of the vessel.

The method comprises receiving S1 signals representative of a desired position of the vessel in the geographic coordinate system. The method further comprises receiving S2 signals representative of an actual position of the vessel in the geographic coordinate system. The method further comprises receiving S3 signals representative of a roll angle and/or a roll rate of the vessel.

The method further comprises controlling S4, in dependence on the signals representative of the desired position, and on the signals representative of the actual position, movements of the position keeping fins 51 to keep the vessel at the desired position. The method further comprises controlling S5 movements of the roll decreasing fins 52 in dependence on the signals representative of the roll angle and/or the roll rate so as to decrease the roll angle and/or the roll rate.

The wind, wave, and/or current conditions where the vessel is positioned may change. The method further comprises determining S6 whether the actual position is at a distance from the desired position which is larger than a first predetermined distance threshold value DT1. As suggested in FIG. 5, the first predetermined distance threshold value DT1 forms a circle around the desired position of the vessel. In this example, the actual position of the vessel is the actual position of the position detecting device 3.

The method further comprises determining S7 whether the actual position is at a distance from the desired position which is larger than a second predetermined distance threshold value DT2. The second predetermined threshold value is larger than the first predetermined threshold value. As suggested in FIG. 5, the second predetermined distance threshold value DT2 forms another circle around the desired position of the vessel.

The determination S6 whether the actual position is at a distance from the desired position which is larger than the first predetermined distance threshold value DT1, is preferably repeated during the execution of the method. Likewise, the determination S7 whether the actual position is at a distance from the desired position which is larger than the second predetermined distance threshold value DT2, is repeated during the execution of the method.

If it is determined S6 that the actual position is at a distance from the desired position which is larger than the first predetermined distance threshold value DT1, a direction of movement of the vessel in relation to the desired position is determined S8 in dependence on the signals representative of the desired position, and on the signals representative of the actual position. Further, the movements of two of more of the fins 51, 52 are controlled S9 in dependence on the determined direction of movement of the vessel, so as for the bow of the vessel to point in a direction which is opposite to the determined direction of movement. This may involve turning the vessel. Such turning may be done by moving the position keeping fins 51 so that the thrusts thereof have opposite directions. The turning movement may also the executed by means of all fins 51, 52.

Thereby, the vessel may point into the wind, the waves, and/or a current, whereby the thrust needed from the fins to keep the vessel in the desired position may decrease. Thereby, the distance between the actual position and the distance may become smaller than the first predetermined distance threshold value DT1.

The wind, wave, and/or current conditions may change further. When the bow of the vessel points in a direction which is opposite to the determined direction of movement, the determination S6 whether the actual position is at a distance from the desired position which is larger than the first predetermined distance threshold value DT1, is repeated.

If, when the bow of the vessel points in a direction which is opposite to the determined direction of movement, it is determined S6 again that the actual position is at a distance from the desired position which is larger than the first predetermined distance threshold value DT1, a further direction of movement of the vessel in relation to the desired position is determined S8. Further, the movements of two or more of the fins 51, 52 are controlled S9 in dependence on the determined further direction of movement of the vessel, so as for the bow of the vessel to point in a direction which is opposite to the further determined direction of movement.

If it is determined S7 that the actual position is at a distance from the desired position which is larger than the second predetermined distance threshold value DT2, movements of all fins 51, 52 are controlled S10 to move the vessel to the desired position. The steps of receiving a desired position, and an actual position are repeated S11, S12. Further, movements of all fins 51, 52 are controlled S13 to keep the vessel in the desired position. Thereby, in a situation where the functions of roll stabilization and vessel position keeping is distributed to different fins, the vessel position cannot be kept, e.g. due to an increasing current, increasing wind, or increasing waves, all fins are used for the vessel position keeping.

Thereby, at changing or increasing winds, waves, or current, a stepwise series of measures are taken, in order to keep the vessel at the desired position.

Figure 7:
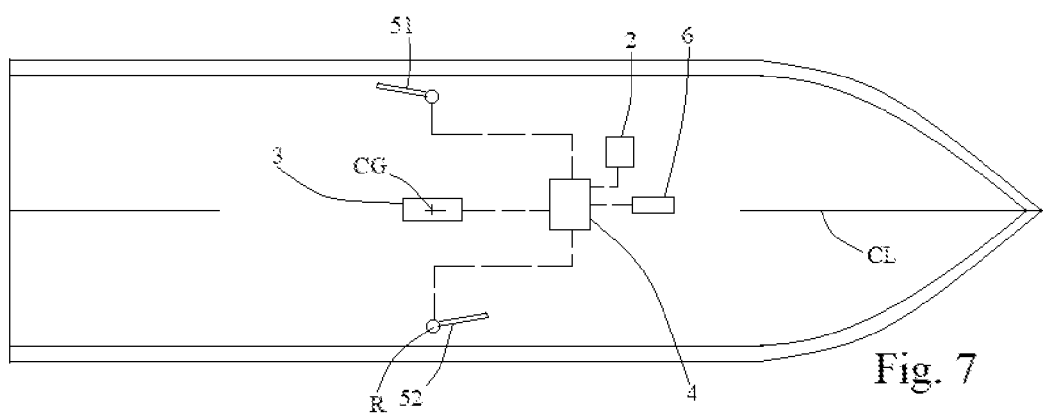
FIG. 7 is a view from underneath of a vessel according to an alternative embodiment of the invention, in which some internal parts of the vessel are indicated.

FIG. 7 shows a vessel which is similar to the one described with reference to FIG. 1-FIG. 6, except for the following difference. The vessel comprises two rather than four fins 51, 52. The fins are distributed of opposite sides of the vessel centerline. In a longitudinal direction of the vessel, the fins are located at the center of gravity of the vessel.

The control unit 4 is arranged to control movements of one of the fins 51 in dependence on signals from the position input device 2, and on signals from the position detecting device 3, to keep the vessel at the desired position. The control unit 4 is further arranged to control movements of the remaining fin 52 in dependence on signals from the roll detection arrangement 6 so as to decrease the roll movements of the vessel.

Figure 8:
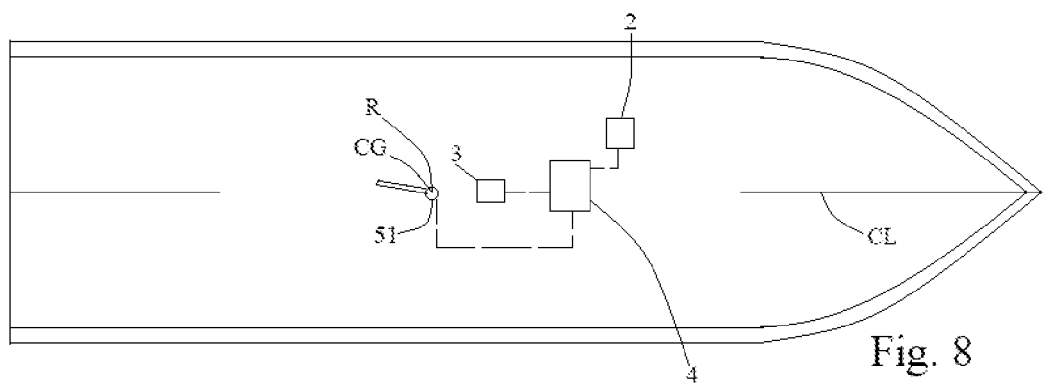
FIG. 8 is a view from underneath of a vessel according to a further alternative embodiment of the invention, in which some internal parts of the vessel are indicated.

FIG. 8 shows a vessel which is similar to the one described with reference to FIG. 7, except for the following differences. The vessel comprises one single fin 51 rather than two fins. The fin is located at the center of gravity of the vessel. The control unit 4 is arranged to control movements of the fin 51 in dependence on signals from the position input device 2, and on signals from the position detecting device 3, to keep the vessel at the desired position.

It is to be understood that the present invention is not limited to the embodiments described above and illustrated in the drawings; rather, the skilled person will recognize that many changes and modifications may be made within the scope of the appended claims.

The invention claimed is:

1. A system for controlling movements of a marine surface vessel comprising a hull, a bow and a stern, the system comprising
    a position input device arranged to specify, in dependence on a user input, a desired position of the vessel in a geographic coordinate system,
    a position detecting device arranged to detect an actual position of the vessel in the geographic coordinate system, and
    a control unit arranged to receive from the position input device signals representative of the desired position of the vessel, and to receive from the position detecting device signals representative of the actual position of the vessel,
    one or more flapping fins for controlling movements of the vessel by interaction with water supporting the vessel,
    the control unit being arranged to control movements of one or more of the one or more flapping fins in dependence on the signals from the position input device, and on the signals from the position detecting device, to keep the vessel at the desired position,
    wherein each of said flapping fins is connected to a respective actuator via a rotation shaft adapted to protrude from the vessel hull, wherein the rotation shaft defines a rotational axis of the flapping fins,
    wherein each of said flapping fins comprises a fin base adapted to be at a first distance from the hull, and a fin tip adapted to be at a second distance from the hull, which second distance is larger than the first distance, wherein a leading edge of the flapping fin and a trailing edge of the flapping fin extend on opposite sides of the flapping fin, from the fin base to the fin tip,
    wherein each of said flapping fins is arranged to be turned at least 360 degrees around the rotational axis to generate thrust through interaction between rotation of the one or more flapping fins and the water supporting the vessel.

2. The system according to claim 1, further comprising a roll detection arrangement, arranged to detect a roll angle and/or a roll rate of the vessel, wherein the control unit is arranged to receive from the roll detection arrangement signals representative of the roll angle and/or the roll rate, the control unit being arranged to control movements of at least one of the one or more flapping fins in dependence on the signals from the roll detection arrangement so as to decrease the roll angle and/or the roll rate.

3. The system according to claim 2, wherein the system comprises two or more flapping fins, wherein the control unit is arranged to control movements of one or more, but less than all, of the flapping fins in dependence on the signals from the position input device, and on the signals from the position detecting device, but not in dependence on the signals from the roll detection arrangement, the control unit further being arranged to control movements of one or more of the remaining one or more flapping fins in dependence on the signals from the roll detection arrangement, but not in dependence on the signals from the position input device, and not in dependence on the signals from the position detecting device.

4. The system according to claim 1, wherein the system comprises two or more flapping fins, wherein the control unit is arranged to establish whether a predetermined condition exists, wherein the control unit is arranged to control, when the existence of the predetermined condition is not established, movements of less than all flapping fins to keep the vessel at the desired position, wherein the control unit is arranged to control, when the existence of the predetermined condition is established, movements of all flapping fins to keep the vessel at the desired position.

5. The system according to claim 4, wherein the control unit is arranged to determine a distance of the actual position from the desired position, wherein the predetermined condition is that the distance of the actual position from the desired position is larger than a predetermined distance threshold value.

6. The system according to claim 1, wherein the control unit is arranged to store a value of a natural roll frequency of the vessel, and to control the movements of the one or more of the one or more flapping fins, in dependence on the value of the natural roll frequency, so as to avoid, or reduce a tendency of, the flapping fin movements exciting the roll angle and/or the roll rate of the vessel.

7. The system according to claim 1, wherein the control unit is arranged to determine in dependence on the signals from the position input device, and on the signals from the position detecting device, a direction of movement of the vessel in relation to the desired position, and to control the movements of one or more of the one or more flapping fins in dependence on the determined direction of movement of the vessel, so as for the bow of the vessel to point in a direction which is opposite to the determined direction of movement.

8. The system according to claim 7, wherein the control unit is arranged to perform said control so as for the bow of the vessel to point in the direction which is opposite to the determined direction of movement, if the actual position is at a distance from the desired position which is larger than a predetermined distance threshold value.

9. A method for controlling a movements of a marine surface vessel comprising a hull, a bow, and a stern, the method comprising
receiving signals representative of a desired position of the vessel in a geographic coordinate system,
receiving signals representative of an actual position of the vessel in the geographic coordinate system,
wherein the vessel comprises one or more flapping fins for controlling movements of the vessel by interaction with water supporting the vessel, controlling, in dependence on the signals representative of the desired position, and on the signals representative of the actual position, one or more of the one or more flapping fins, to keep the vessel at the desired position by rotation of the one or more flapping fins to generate thrust through interaction between rotation of the one or more flapping fins and the water supporting the vessel,
receiving signals representative of a roll angle and/or a roll rate of the vessel, and
controlling movements of one or more of the one or more flapping fins in dependence on the signals representative of the roll angle and/or the roll rate so as to decrease the roll angle and/or the roll rate.

10. A method for controlling a movements of a marine surface vessel comprising a hull, a bow, and a stern, the method comprising:
receiving signals representative of a desired position of the vessel in a geographic coordinate system,
receiving signals representative of an actual position of the vessel in the geographic coordinate system,
wherein the vessel comprises one or more flapping fins for controlling movements of the vessel by interaction with water supporting the vessel, controlling in dependence on the signals representative of the desired position, and on the signals representative of the actual position, one or more of the one or more flapping fins, to keep the vessel at the desired position by rotation of the one or more flapping fins to generate thrust through interaction between rotation of the one or more flapping fins and the water supporting the vessel, and
determining in dependence on the signals representative of the desired position, and on the signals representative of the actual position, a direction of movement of the vessel in relation to the desired position, and controlling the movements of one or more of the one or more flapping fins in dependence on the determined direction of movement of the vessel, so as for the bow of the vessel to point in a direction which is opposite to the determined direction of movement.

11. A computer program product comprising a non-transitory computer readable medium storing program code executable by a computer to perform the steps of the method of claim 9.

12. A computer program product comprising a non-transitory computer readable medium storing program code executable by a computer to perform the steps of the method of claim 10.

13. A control unit configured to perform the steps of the method of claim 9.

14. A control unit configured to perform the steps of the method of claim 10.

15. The system according to claim 1, further comprising a marine surface vessel comprising the position input device, the position detecting device, the control unit, and the one or more flapping fins.

16. The system according to claim 15 further comprising at least two flapping fins arranged to be moved to keep the vessel at the desired position, which flapping fins are distributed around a center of gravity of the vessel.

* * * * *